(12) United States Patent
Shinjo et al.

(10) Patent No.: US 6,427,316 B1
(45) Date of Patent: Aug. 6, 2002

(54) MANUFACTURING METHOD OF A ROTATION SENSOR

(75) Inventors: Izuru Shinjo; Noriaki Hayashi; Naoki Hiraoka; Wataru Fukui; Yutaka Ohashi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/432,158

(22) Filed: Nov. 2, 1999

Related U.S. Application Data

(63) Continuation of application No. 08/825,088, filed on Mar. 27, 1997, now Pat. No. 6,061,895, which is a continuation of application No. 08/630,584, filed on Apr. 10, 1996, now Pat. No. 5,821,744.

(30) Foreign Application Priority Data

Oct. 11, 1995 (JP) .............................. 7-263122

(51) Int. Cl.$^7$ ................................. H01F 7/06
(52) U.S. Cl. ................. 29/602.1; 29/827; 324/207.2; 324/207.21; 324/173; 324/174
(58) Field of Search ................ 29/602.1, 827, 29/848; 324/207.21, 207.2, 173, 174, 251, 252

(56) References Cited

U.S. PATENT DOCUMENTS

| | | | |
|---|---|---|---|
| 4,117,523 A | 9/1978 | Masuda | 324/525 |
| 4,992,734 A | 2/1991 | Adachi | 324/207.2 |
| 4,994,739 A | 2/1991 | Honda et al. | 324/207.2 |
| 5,093,617 A | 3/1992 | Murata | 324/207.2 |
| 5,138,258 A | 8/1992 | Murata | 324/207.2 |
| 5,377,403 A | 1/1995 | Hart, Jr. et al. | 29/848 X |
| 5,529,959 A | 6/1996 | Yamanaka | 29/827 X |
| 5,560,462 A | 10/1996 | Gustin | 324/207.2 |
| 6,061,895 A | * 5/2000 | Shinjo et al. | 29/602.1 |

FOREIGN PATENT DOCUMENTS

| | | | |
|---|---|---|---|
| JP | 2-85324 | 7/1990 | G01D/21/00 |
| JP | 2-118282 | 9/1990 | G01R/33/06 |
| JP | 3-28631 | 3/1991 | H01H/36/00 |
| JP | 3-28632 | 3/1991 | H01H/36/00 |
| JP | 3-48715 | 5/1991 | G01D/5/245 |
| JP | 6-76865 | 10/1994 | G01P/3/488 |
| JP | 7-198736 | 8/1995 | G01P/3/488 |

* cited by examiner

Primary Examiner—Carl J. Arbes
(74) Attorney, Agent, or Firm—Sughrue Mion, PLLC

(57) ABSTRACT

A method of manufacturing a rotation sensor is provided. In the method, an insert conductor having a predetermined shape and having at least a connector terminal and a conversion device terminal is provided. The insert conductor is insert-molded in a resin base such that at least the connector terminal and the conversion device terminal of the insert conductor remain exposed from the resin base. A resin connector part is molded such that the resin connector part encircles the connector terminal. Also, a magnetoelectric conversion device is connected to the conversion device terminal of the insert conductor, and positioning parts are provided at a tip of the resin base. In addition, the magnetoelectric conversion device is sandwiched between the positioning parts to securely hold the magnetoelectric conversion device, and a press fit part is formed at the tip of the resin base. Also, an output terminal of the magnetoelectric conversion device is pressed against the conversion device terminal of the insert conductor with the press fit part.

17 Claims, 6 Drawing Sheets

MANUFACTURING METHOD OF A ROTATION SENSOR

This is a continuation of application Ser. No. 08/825,088, that was filed on Mar. 27, 1997, and that issued on May 16, 2000, as U.S. Pat. No. 6,061,895. Also, application Ser. No. 08/825,088 is a continuation of application Ser. No. 08/630,584, that was filed on Apr. 10, 1996, and that issued on Oct. 13, 1998, as U.S. Pat. No. 5,821,744. The disclosures of both applications are incorporated herein by reference.

BACKGROUND OF THE INVENTION

This invention relates to a rotation sensor for detecting the number of revolutions of a gear-like magnetic rotation body, for example, and a manufacturing method therefor.

A rotation sensor for detecting the number of revolutions of a gear-like magnetic rotation body is proposed, for example, in Japanese Patent Laid-Open No. Hei 7-198736. In such sensor in that a magnetoelectric conversion device is used to detect a magnetic flux change caused, by rotation of a magnetic rotation body, a terminal for outputting a signal of the magnetoelectric conversion device is insert-molded in a base made of resin, the magnetoelectric conversion device is electrically connected to the terminal, a part of the terminal is used as a surface mount electrode to mount electronic components, the surface mount electrode part is provided by bending the terminal to produce a layered structure, and a connector part is formed using the terminal end as terminal electrode.

For the conventional rotation sensor, the base made of resin and the connector part of an insert conductor are simultaneously formed by insert-molding. Thus, the thus resin pressure at molding causes the insert conductor to be deformed and adjacent insert conductors to be short-circuited. To prevent the insert conductor from being deformed, the insert conductor needs to be sandwiched and held between pins disposed in a metal mold at a large number of points at molding. Resultantly, the insert conductor is exposed to the holding parts. Thus, seal material needs to be applied to the insert conductor exposure parts to prevent moisture entering from the outside from causing a short circuit. As a result workability is poor.

Further, the surface mount electrode part formed by the insert conductor is layered. To provide a layered structure, two or more bending steps are required and workability is poor.

To provide a layered structure, the electrode area before bending requires twice that after bending at each surface mount electrode, thus the number of surface mount electronic components cannot be increased and freedom of layout is restricted.

SUMMARY OF THE INVENTION

It is therefore an object of the invention to provide a rotation sensor having a simple structure manufactured simply at low costs with high reliability and excellent workability and a manufacturing method therefor.

According to the first aspect of the invention, there is provided a rotation sensor in that a magnetoelectric conversion device is used to detect a magnetic flux change caused by rotation of a magnetic rotation body, a conductor for guiding output of the magnetoelectric conversion device to the outside is insert-molded in a base made of resin, the magnetoelectric conversion device is electrically connected to the insert conductor, a part of the insert conductor is used as a surface mount electrode to mount electronic components, a connector part is formed using the insert conductor end as terminal electrode, a groove for mounting an O-ring is formed, and an O-ring is made to intervene between a case and the connector part, thereby sealing in the case.

According to the second aspect of the invention, there is provided a rotation sensor in that a magnetoelectric conversion device is used to detect a magnetic flux change caused by rotation of a magnetic rotation body, a conductor for guiding output of the magnetoelectric conversion device to the outside is insert-molded in a base made of resin, the magnetoelectric conversion device is electrically connected to the insert conductor, a part of the insert conductor is used as a surface mount electrode to mount electronic components, a connector part is formed using the insert conductor end as terminal electrode, and pockets are formed by forming walls surrounding interfaces produced to support the base when the connector part is molded, and are filled with an adhesive.

According to the third aspect of the invention, there is provided a rotation sensor in that a magnetoelectric conversion device is used to detect a magnetic flux change caused by rotation of a magnetic rotation body, a conductor for guiding output of the magnetoelectric conversion device to the outside is insert-molded in a base made of resin, the magnetoelectric conversion device is electrically connected to the insert conductor, a part of the insert conductor is used as a surface mount electrode to mount electronic components, a connector part is formed using the insert conductor end as terminal electrode, a groove corresponding to a joint of the insert conductor is formed, and recesses or projections are made on the outer peripheral surface of the groove.

According to the fourth aspect of the invention, there is provided a rotation sensor in that a magnetoelectric conversion device is used to detect a magnetic flux change caused by rotation of a magnetic rotation body, a conductor for guiding output of the magnetoelectric conversion device to the outside is insert-molded in a base made of resin, and the magnetoelectric conversion device is electrically connected to the insert conductor in a state in which it is sandwiched between positioning parts disposed at the tip of the base.

According to the fifth aspect of the invention, there is provided a rotation sensor in that a magnetoelectric conversion device is used to detect a magnetic flux change caused by rotation of a magnetic rotation body, a conductor for guiding output of the magnetoelectric conversion device to the outside is insert-molded in a base made of resin, and the magnetoelectric conversion device is pressed into a press fit part formed in the base for fixing leads of the magnetoelectric conversion device, then is electrically connected to the insert conductor.

According to the sixth aspect of the invention, there is provided a rotation sensor in that a magnetoelectric conversion device is used to detect a magnetic flux change caused by rotation of a magnetic rotation body, a conductor for guiding output of the magnetoelectric conversion device to the outside is insert-molded in a base made of resin, the magnetoelectric conversion device is electrically connected to the insert conductor, a part of the insert conductor is used as a surface mount electrode to mount electronic components, a connector part is formed using the insert conductor end as terminal electrode, and the surface mount electrode part of the insert conductor is heightened with respect to peripheries.

According to the seventh aspect of the invention, there is provided a rotation sensor wherein a magnetoelectric conversion device is used to detect a magnetic flux change caused by rotation of a magnetic rotation body, a conductor for guiding output of the magnetoelectric conversion device to the outside is insert-molded in a base made of resin, the magnetoelectric conversion device is electrically connected to the insert conductor, a part of the insert conductor is used as a surface mount electrode to mount electronic components, a connector part is formed using the insert conductor end as terminal electrode, and in a state in which the base is positioned by guides formed in a case made of resin having a mount part, the base and the case are fixed mutually.

According to the eighth aspect of the invention, there is provided a method of manufacturing a rotation sensor comprising the steps of stamping an insert conductor into a predetermined shape, insert-molding the stamped insert conductor in a base and cutting an unnecessary joint, molding a connector part in the base, connecting a magnetoelectric conversion device to the insert conductor, mounting surface mount electronic components on predetermined positions of the insert conductor, and inserting the base into a case, heat-caulking a case end, and fixing the base and the case mutually.

According to the ninth aspect of the invention, there is provided a method of manufacturing a rotation sensor comprising the steps of stamping an insert conductor into a predetermined shape, insert-molding the stamped insert conductor in a base and cutting an unnecessary joint, molding a connector part in the base, connecting a magnetoelectric conversion device to the insert conductor, mounting surface mount electronic components on predetermined positions of the insert conductor by using positioning parts formed on a frame formed in the insert conductor existing between a plurality of the bases, cutting the frame formed in the insert conductor, and inserting the base into a case, heat-caulking a case end, and fixing the base and the case mutually.

According to the tenth aspect of the invention, there is provided a method of manufacturing a rotation sensor comprising the steps of stamping an insert conductor into a predetermined shape, insert-molding the stamped insert conductor in a base and cutting an unnecessary joint, molding a connector part in the base, connecting a magnetoelectric conversion device to the insert conductor, mounting surface mount electronic components on predetermined positions of the insert conductor, making a resin injection port near the magnetoelectric conversion device and molding a case, and inserting the base into the case, heat-caulking a case end, and fixing the base and the case mutually.

DETAILED DESCRIPTION OF THE PREFERRED EMBODIMENTS

Referring now to the accompanying drawings, there are shown preferred embodiments of the invention.

First Embodiment

The configuration of a rotation sensor according to a first embodiment of the invention will be discussed with reference to the accompanying drawings.

Figure 1:
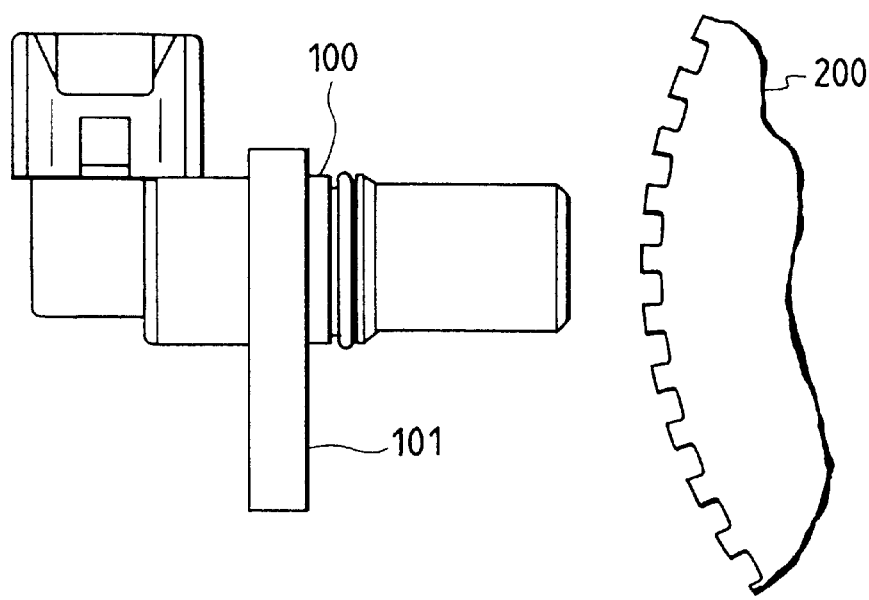
FIG. 1 is a side view showing a rotation sensor according to a first embodiment of the invention.

FIG. 1 is a side view showing a state of the rotation sensor in use according to the first embodiment of the invention. A numeral 100 is the rotation sensor and numeral 200 is a gear-like magnetic rotation body. The rotation sensor 100 detects the number of revolutions and the rotation angle in response to rotation of the gear-like magnetic rotation body 200 for sensing wheel rotation of an automobile, for example. Numeral 101 is a mount part for mounting the rotation sensor 100 on a car body.

Figure 2:
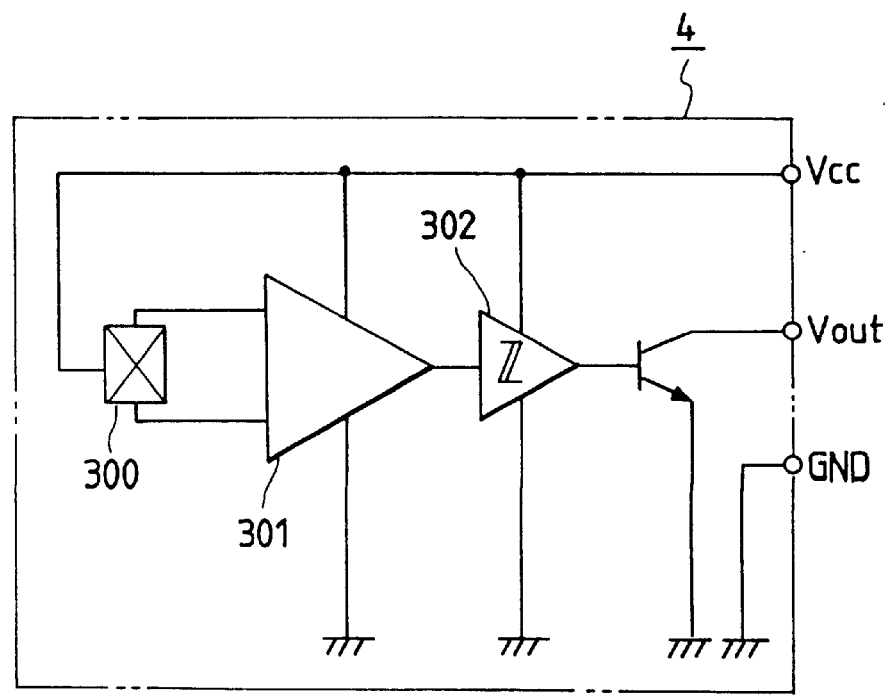
FIG. 2 is a circuit diagram showing a magnetoelectric conversion device of the rotation sensor.

FIG. 2 is a circuit diagram showing a magnetoelectric conversion device in the rotation sensor 100. A numeral 4 is the magnetoelectric conversion device using a hall IC disposed near a permanent magnet (not shown). The hall IC 300 detects a magnetic field change caused by rotation of the gear-like magnetic rotation body 200 as a voltage change, a differential amplifier 301 amplifies the voltage change occurring in the hall IC 300, and a Schmitt trigger circuit 302 converts the amplification result into a pulse waveform. Then, the signal is sent via an insert conductor or the like to an external computer unit (not shown) to detect the number of revolutions and the rotation angle. A magnetoresistance device or the like may be used as the magnetoelectric conversion device 4.

Figure 3:
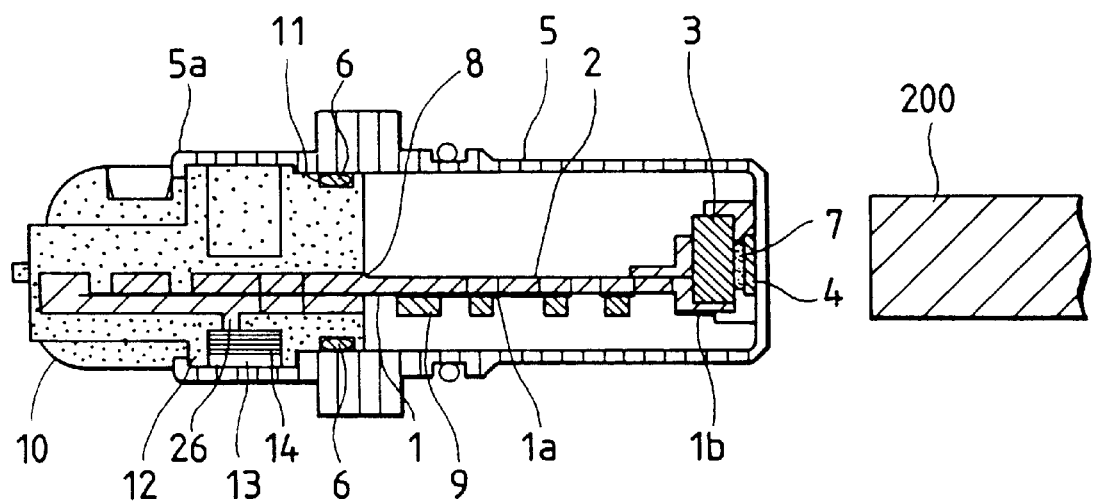
FIG. 3 is a sectional view showing the rotation sensor according to the first embodiment of the invention.

FIG. 3 is a sectional side view showing the internal structure of the rotation sensor according to the first embodiment. A numeral 1 is an insert conductor, which is insert-molded in a base 2 made of resin (to mold the base 2 with resin, when the resin is hardened, the insert conductor 1 is disposed in the resin); most of the insert conductor 1 is covered.

A surface mount electrode part 1a formed by bending the insert conductor 1 is exposed at a predetermined place of the surface of the base 2, and a surface mount electronic component 9 for noise removal, such as a capacitor, is mounted on the surface mount electrode 1a.

That is, the insert conductor 1 is insert-molded in the base 2 so that only the mount electrode 1a, a magnetoelectric conversion device terminal 1b, and a connector terminal electrode 1c (not shown) are exposed.

Numeral 3 is a permanent magnet, which is insert-molded in the base 2 like the tip of the insert conductor 1.

Numeral 4 is the magnetoelectric conversion device disposed near the permanent magnet 3.

Numeral 200 is the gear-like magnetic rotation body placed facing the permanent magnet 3 and the magnetoelectric conversion device 4.

Numeral 5 is a case fixed to the outer portion of the base 2 and numeral 6 is an O-ring installed in the fitting part between the base 2 and the case 5. A rear end 5a of the case 5 is heat-caulked.

Numeral 7 is RTV (room temperature vulcanizing) rubber. The magnetoelectric conversion device 4 is attached via the RTV rubber 7 to the permanent magnet 3 insert-molded in the base 2.

An elastic force of the RTV rubber 7 minimizes deflection of the magnetoelectric conversion device 4 caused by external vibration.

Numeral 8 is a mold interface between the base 2 and a connector part 10. The mold interface 8 can be formed inside the O-ring.

Figure 4:
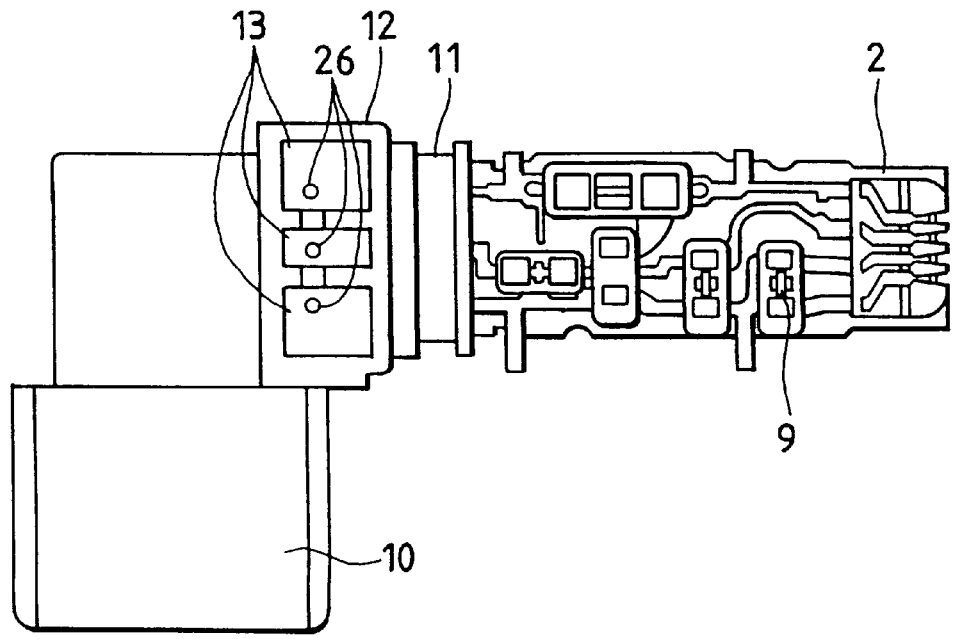
FIG. 4 is a plan view showing a base and a connector part in the process of manufacturing the rotation sensor.

FIG. 4 is a plan view showing the base 2 and the connector part 10 in the process of manufacturing the rotation sensor. A numeral 9 is an electronic component such as a capacitor which is mounted on at least a part of the exposed portion of the insert conductor 1 as the surface mount electrode part, and is connected to the magnetoelectric conversion device (not shown). Numeral 10 is the connector part containing a connector terminal electrode. Numeral 11 is an O-ring groove into which the O-ring is fitted so as to serve as a fit part between the connector part 10 and the case 5. Numeral 12 designates walls formed surrounding interfaces between the base 2 and the connector part 10. Numeral 13 designates pockets corresponding to the interfaces 26; the pockets 13 are filled with an adhesive.

According to the first embodiment of the invention, the O-ring groove 11 for fitting the O-ring 6 is formed together with the molding of the connector part 10, thus making it possible to form the mold interface 8 between the base 2 and the connector part 10 inside the O-ring and eliminating the need for sealing the interface 8, thus improving workability and reliability.

The O-ring 6 is made to intervene between the case 5 and the connector part 10, thereby sealing in the case, thus improving workability and reliability.

Second Embodiment

Figure 5:
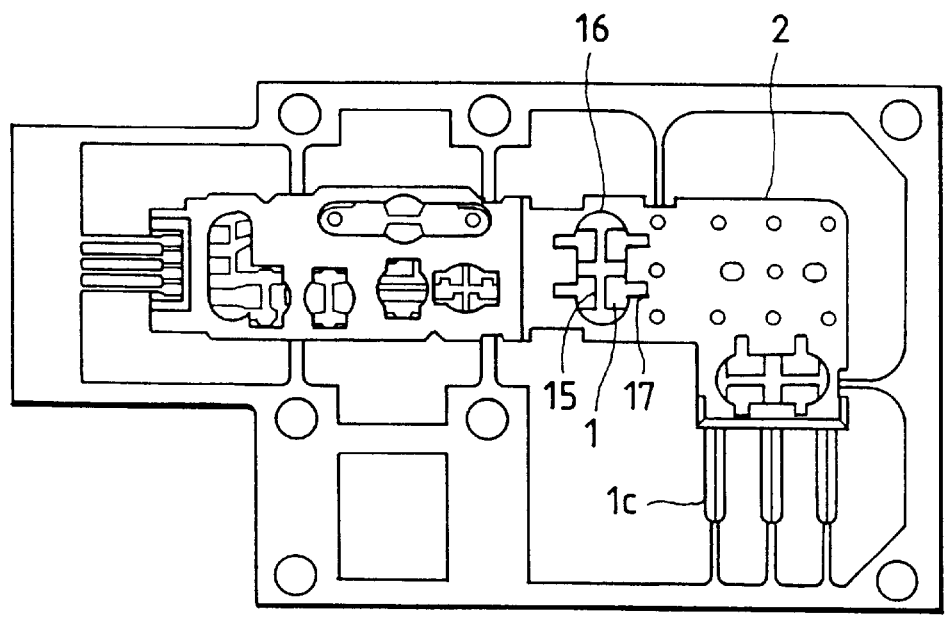
FIG. 5 is a plan view showing a base in the process of manufacturing a rotation sensor according to a second embodiment of the invention.
Figure 6:
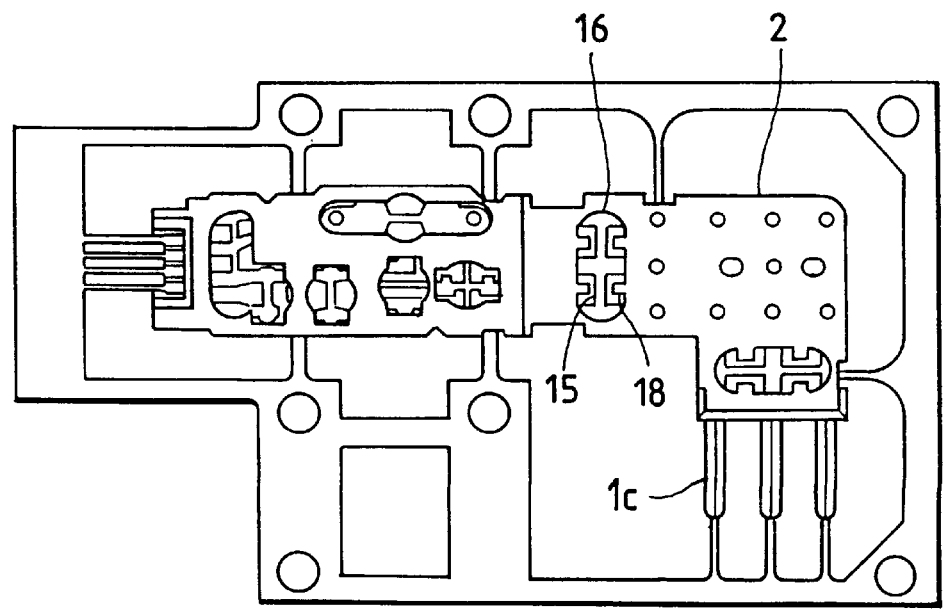
FIG. 6 is another plan view showing the base in the process of manufacturing the rotation sensor.

FIG. 5 is a plan view showing a base 2 in the process of manufacturing a rotation sensor according to a second embodiment of the invention. FIG. 6 is another plan view showing the base 2 in the process of manufacturing the rotation sensor. Numeral 15 is a joint and numeral 16 is an opening window. Related to the cut place of predetermined unnecessary joint 15 of an insert conductor 1 of the base is the groove 16 viewed from the rear so as to facilitate setting a stamping die. Recesses 17 are made in the outer peripheral surface of the opening window 16. In FIG. 6, contrary, projections 18 are formed.

Since the recesses 17 or the projections 18 are made in the outer peripheral surface of the opening window 16, the creepage distance lengthens and the creepage form is complicated, thus preventing the possibility that plating of the insert conductor thus, short-circuiting different conductors at reflow. Thus, product yield and reliability are improved.

Since the opening window 16 is positioned corresponding to the joint 15 of the insert conductor 1, when the joint is cut, the form of the opening window 16 can be used for alignment and workability is improved. Since no resin exists in the joint 15, resin need not cut in the joint 15, improving workability, prolonging the punch life of a cutter jig, and improving maintainability.

A connector part 10 is molded in a connector terminal electrode 1c exposed from the base 2 and at the same time, an O-ring groove 11 is also molded. As shown in FIG. 4, walls 12 are formed surrounding interfaces 26 between the base 2 and the connector part 10 produced to support the base 2, and pockets 13 are related to the interfaces 26.

When the connector part 10 is molded in the base 2, the walls 12 are formed surrounding the interfaces 26 produced to support the base 2 and the pockets 13 are formed. Thus, the pockets 13 may be filled with an adhesive 14 (FIG. 3) for sealing the interfaces 26, preventing the adhesive 14 from flowing into an unnecessary part an causing trouble in the following manufacturing steps. Thus, workability and product yield are improved.

Third Embodiment

Figure 7:
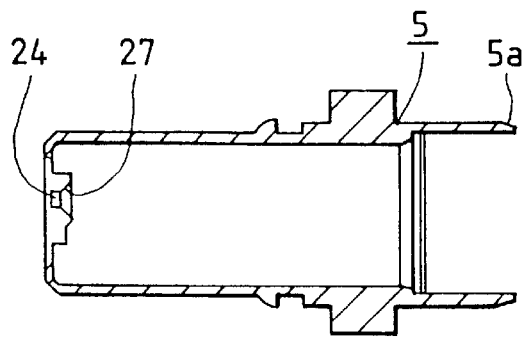
FIG. 7 is a sectional view showing a case of a rotation sensor according to a third embodiment of the invention.
Figure 8:
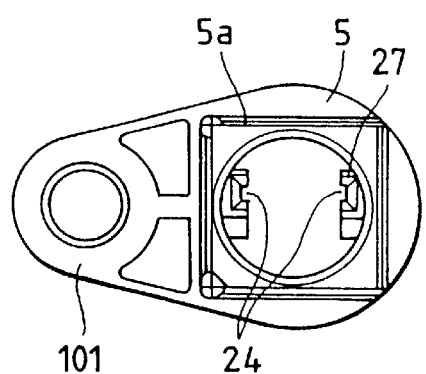
FIG. 8 is a plan view showing the case of the rotation sensor.

FIG. 7 is a sectional view showing a case 5 of a rotation sensor according to a third embodiment of the invention. FIG. 8 is a plan view showing the case 5.

As shown in FIG. 3, O-ring 6 is mounted on O-ring groove so as to serve as a fit part between connector part 10 and the base 2. With the tip of a base 2 positioned by guides 24 formed inside the case 5 (FIG. 7, 8), the case 5 is fixed outside the O-ring 6 and the base 2, and a rear end 5a of the case 5 is heat-caulked. As shown in FIGS. 7 and 8, a taper 27 is provided on the full mouth of each guide 24 so as to facilitate insertion of the base 2.

Since the guides 24 for fixing the base 2 are formed inside the case 5, resistance to vibration is improved and the relative positional relationship of a permanent magnet 3 and a magnetoelectric conversion device 4 to a magnetic rotation body 200 is stabilized. Likewise, a magnetic circuit made up of them is stabilized and performance and reliability are improved.

Fourth Embodiment

Figure 9:
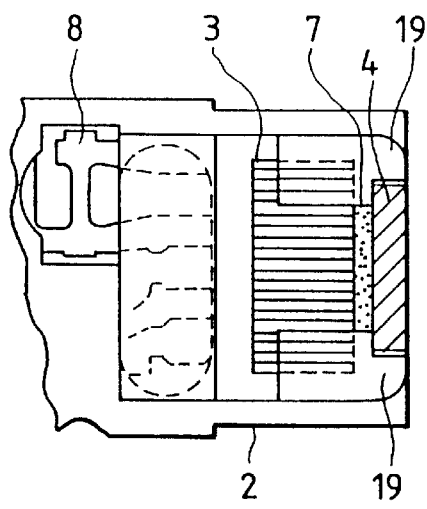
FIG. 9 is an enlarged bottom view showing the base tip of a rotation sensor according to a fourth embodiment of the invention.

In FIG. 9, numeral 19 is a positioning part disposed at the tip of a base 2. The magnetoelectric conversion device 4 is put between the positioning parts 19 formed in the base 2 for positioning and is attached via RTV rubber 7 to a permanent magnet 3 insert-molded in the base 2. At this time, an elastic force of the RTV rubber 7 minimizes deflection of the magnetoelectric conversion device 4 caused by external vibration.

Since the base 2 is formed with the positioning parts 19, the electromagnetic conversion device 4 is positioned by the positioning parts 19, thereby improving workability and resistance to relative position shift to the permanent magnet 3 when an external force is applied to the magnetoelectric conversion device 4 in the subsequent steps.

Since the magnetoelectric conversion device 4 has high resistance to relative position shift to the permanent magnet 3, the relative positional relationships among the permanent magnet 3, the magnetic rotation body 200, and the magnetoelectric conversion device 4 are stabilized. Likewise, a magnetic circuit made up of them is stabilized and performance and reliability are improved.

Fifth Embodiment

Figure 10:
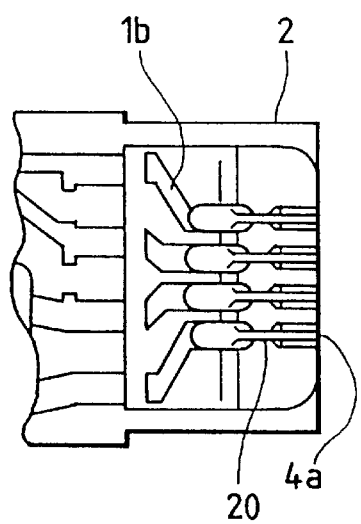
FIG. 10 is an enlarged plan view showing the base tip of a rotation sensor according to a fifth embodiment of the invention.

In FIG. 10, numeral 20 is a press fit part being formed in a base 2 for pressing a lead 4a of a magnetoelectric conversion device 4. The lead 4a of the magnetoelectric conversion device 4 is pressed into the press fit part 20, then is connected to a terminal 1b of an insert conductor molded in one piece.

Since the base 2 is formed with the press fit part for pressing the lead 4a of the magnetoelectric conversion device 4, the lead 4a of the magnetoelectric conversion device 4 is fixed to the base 2 even before completion of a soldering step. When solder is applied, deforming the lead 4a becomes hard and improves the workability and reliability of soldering. After soldering, the lead 4a of the magnetoelectric conversion device 4 is fixed at two points of the press fit part 20 and the soldering part, thus reliability of vibration resistance, etc., is improved.

Sixth Embodiment

Next, a manufacturing method of an insert conductor 1 will be discussed.

Figure 11:
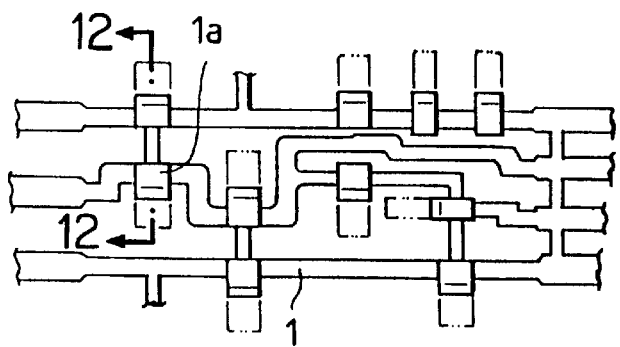
FIG. 11 is a plan view showing a conventional insert conductor.
Figure 12:
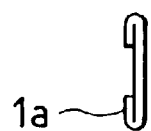
FIG. 12 is a sectional view taken on line A—A in FIG. 11 showing an insert conductor in the process of manufacturing a rotation sensor.

FIG. 11 is a plan view showing a conventional insert conductor stamped into a predetermined shape, in that numeral 1a is a surface mount electrode part to which an electronic component 9 (not shown) is connected. For the surface mount electrode part 1a, a predetermined place of the conventional insert conductor 1 is bent and pressed so as to provide a layered structure as shown in Figure which is a sectional view taken on line A—A in FIG. 11.

However, the layered structure of the surface mount electrode part 1a requires two or more bending steps and workability is poor. The area of the surface mount electrode part before bending 1a requires twice that after bending, and thus the number of electronic components cannot be increased and freedom of layout is restricted. It is more advantageous to adopt a structure shown in FIG. 13.

Figure 13:
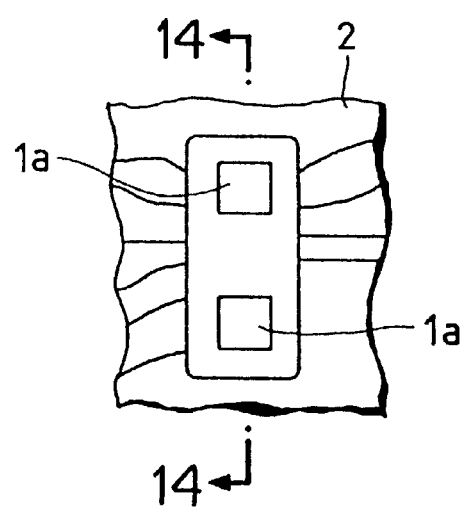
FIG. 13 is a plan view of a main part of an insert conductor according to a sixth embodiment of the invention.
Figure 14:
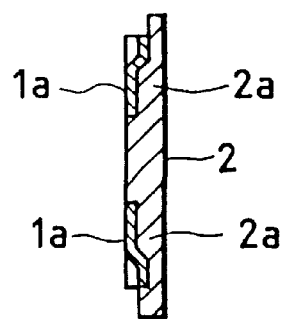
FIG. 14 is a sectional view of the insert conductor, taken on line B—B in FIG. 13.

FIG. 13 is a partially enlarged plan view showing surface mount electrode parts 1a of a base 2 in the process of manufacturing a rotation sensor according to a sixth embodiment of the invention. FIG. 14 is a partially enlarged sectional view of the surface mount electrode parts 1a, taken on line B—B in FIG. 13. In FIGS. 13 and 14, the surface mount electrode parts 1a are formed by bending an insert conductor 1 so as to heighten with respect to peripheral bases 2a. Thus, the parts 1a are exposed to predetermined points of the surface of the base 2. Surface mount electronic components 9 such as capacitors are mounted on the surface mount electrode parts 1a. That is, the insert conductor 1 is insert-molded in the base 2 so that only the mount electrodes 1a, a magnetoelectric conversion device terminal 1b, and a connector terminal electrode 1c are exposed.

Since the surface mount electrode parts 1a of the insert conductor 1 are heightened with respect to the peripheral bases 2a, stress caused by thermal constriction of the mold resin material of the base 2 can be decreased, improving heat shock resistance of the joints of the surface mount electrode parts 1a and the electronic components 9, and improving reliability of the sensor.

Since the surface mount electrode parts 1a of the insert conductor 1 are of a single structure rather than double structure, the pressing process can be reduced, improving workability. Also, the number of surface mount electrode parts can be increased, improving freedom of layout.

Seventh Embodiment

Next, a manufacturing process of the rotation sensor will be discussed.

Pressing step:

First, an insert conductor 1 is stamped into a predetermined shape by pressing it from hoop material of a coiled brass slip. Next, electrode parts 1a where electronic components of the insert conductor are mounted are bent so as to heighten them with respect to peripheral bases 2a as shown in FIG. 14, and the magnetoelectric conversion device terminal 1b at the tip of the insert conductor 1 and the connector terminal electrode 1c are bent into predetermined shapes.

Cutting step:

The insert conductor 1 processed as described above is insert-molded integrally with base 2 of a resin mold. As shown in FIGS. 5 and 6, a predetermined unnecessary joint 15 of the insert conductor 1 is cut by pressing. The opening window 16 viewed from the rear is related to the cut part of the joint 15 so as to facilitate setting of a stamping die.

The surface mount electrodes 1a of the insert conductor 1 insert-molded in the base 2 are not covered by the base and become mount lands of the surface mount electronic components 9. That is, as shown in FIG. 14, with the insert conductor 1 bent, the lands heighten with respect to the peripheral bases 2a and are exposed to the surface of the base 2 without being covered by the base 2.

Molding step:

Connector parts 10 are molded in portions corresponding to connector terminal fit parts 1c exposed to the base 2 and at the same time, the O-ring groove 11 is formed and a permanent magnet 3 is also insert-molded. At this time, walls 12 are formed surrounding interfaces 26 between the base 2 and the connector parts 10 produced to support the base 2, thereby relating pockets 13 to the interfaces 26, and the pockets 13 are filled with an adhesive 14 for sealing the interfaces 26.

Connection step:

Next, RTV rubber 7 is applied to the permanent magnet 3 and the magnetoelectric conversion device 4 is fitted so as to be put between positioning parts 19 formed in the base 2, then leads 4a of the magnetoelectric conversion device 4 are pressed into press fit parts 20 formed in the base 2 and connected to the terminals 1b at the tip of the insert conductor 1.

Figure 15:
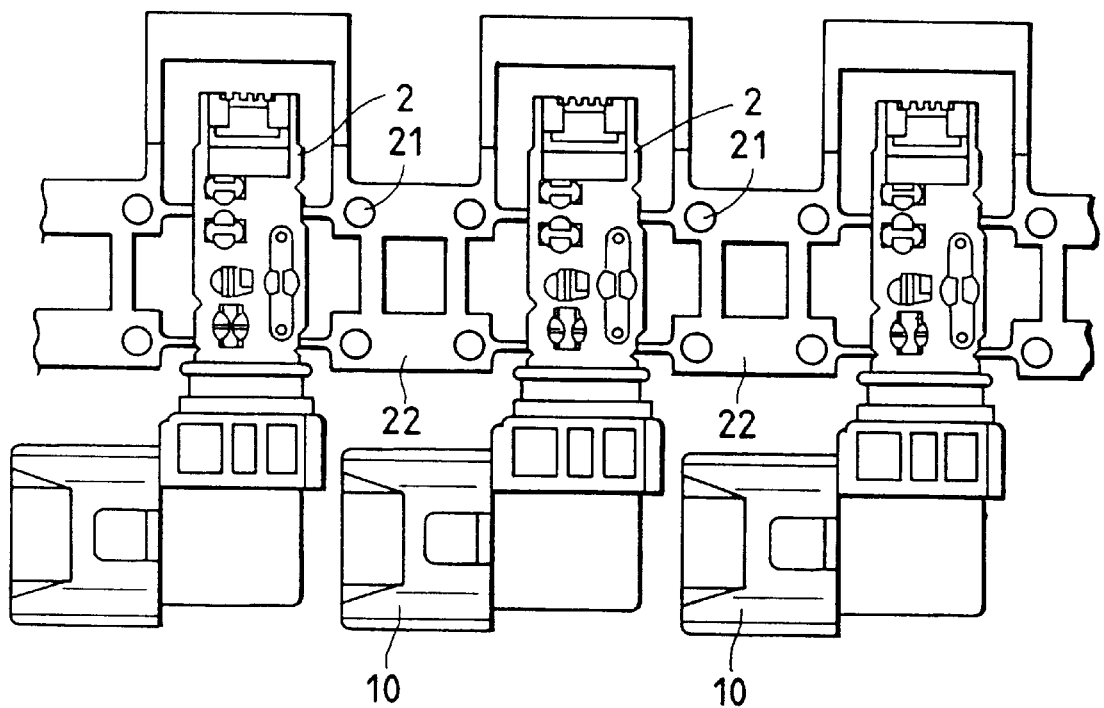
FIG. 15 is a plan view showing bases and connector parts in the process of manufacturing a rotation sensor according to a seventh embodiment of the invention.

Mounting step:

FIG. 15 is a plan view showing the bases 2 and the connector parts 10 in the process of manufacturing the rotation sensor. A plurality of bases 2 are connected by frames 22 of the insert conductors 1. By using positioning parts 21 disposed on the frame 22 for alignment, solder (not shown) is applied onto the surface mount electrodes 1a, the surface mount electronic components 9 such as capacitors and resistors are mounted on the surface mount electrodes 1a, and both the leads 4a and the surface mount electronic components 9 are reflow-soldered, then the frames 22 are cut.

Fixing step:

O-ring 6 is mounted on the O-ring groove 11 of the connector part 10 and inserted so that the tip of the base 2 is positioned by guides 24 formed inside the case 5, and case end 5a is heat-caulked.

Figure 16:
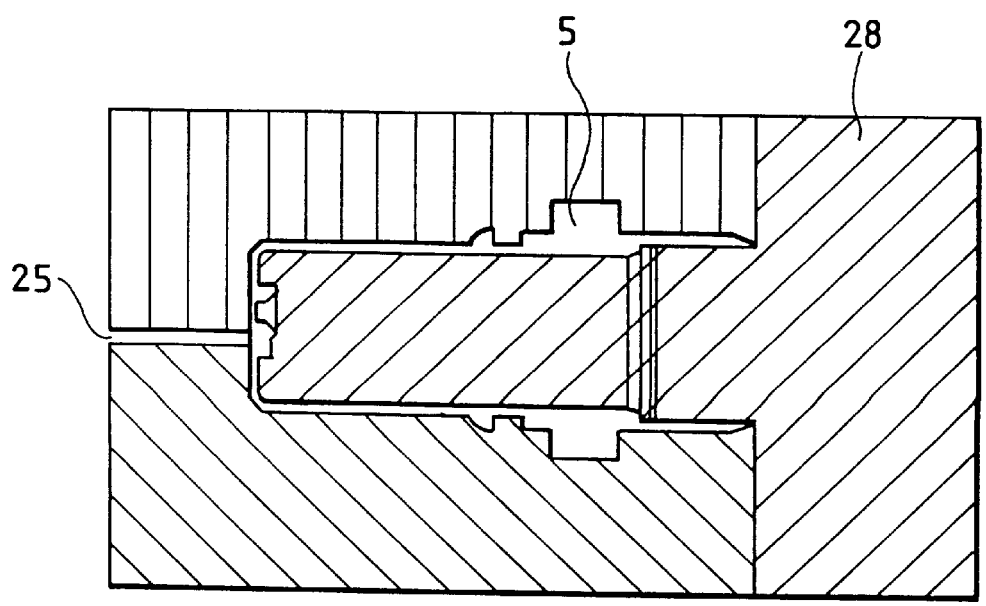
FIG. 16 is a sectional view showing a manufacturing method of a case of the rotation sensor.

FIG. 16 is a sectional view showing a manufacturing method of the case 5 of the rotation sensor. As shown here, the case 5 is molded with a metal mold 28 and a resin injection port 25 when the case 5 is molded is disposed near the position where the magnetoelectric conversion device 4 is positioned when the base 2 is fitted into the case 5. Thus, resin of the case 5 between the magnetoelectric conversion device and a magnetic rotation body can be thinned, improving sensor performance.

In such a manufacturing method, the base 2 and the connector part 10 are molded in different steps, thus when the base 2 is molded, the insert conductor 1 can be held with a metal mold; resin pressure at molding does not cause the insert conductor 1 to be deformed or different insert conductors to be short-circuited.

Since the insert conductor 1 is positioned and fixed by resin when the base 2 is molded, when the connector part 10 is molded, the insert conductor 1 is not exposed to the surface, improving workability and reliability.

Further, since the frame 22 formed by the insert conductor 1 having the positioning parts between the bases 2 is provided, the positioning parts 21 of the frame 22 formed by the insert conductor 1 can be used to mount and reflow-solder the electronic components 9, improving workability.

The steps can be executed in the order of application of solder, mounting and reflow-soldering of the electronic components 9, and cutting of the frame 22 of the insert conductor 1, productivity being improved and manufacturing costs being reduced.

Further, since the resin injection port 25 when the case 5 is molded is disposed near the position of the magnetoelectric conversion device 4, resin of the case 5 between the magnetoelectric conversion device 4 and the magnetic rotation body 100 can be thinned, improving sensor performance.

According to the invention, the O-ring groove for fitting the O-ring is formed between the case and the connector part, thus making it possible to form the mold interface between the base and the connector part inside the O-ring and eliminating the need for sealing the interface, thereby improving workability and reliability. The O-ring is made to intervene between the case and the connector part, thereby sealing in the case, thus improving workability and reliability.

According to the invention, when the connector part is molded, the walls are formed surrounding the interfaces produced to support the base and the pockets are formed. Thus, the pockets may be filled with an adhesive for sealing the interfaces, preventing the adhesive from flowing into an unnecessary part, causing trouble in the following steps; workability and product yield are improved.

According to the invention, the recesses or the projections are made in the outer peripheral surface of the groove, whereby the creeping distance lengthens and the creeping form is complicated, thus preventing occurrence of trouble such that plating of the insert conductor melts, short-circuiting different conductors at reflow. Thus, product yield and reliability are improved.

The opening window is related to the joint of the insert conductor, whereby when the joint is cut, the form of the groove can be used for alignment and workability is improved. Since no resin exists in the joint, resin need not cut in the joint, improving workability, prolonging the punch life of a cutter jig, and improving maintainability.

According to the invention, the base is formed with the positioning parts, whereby the electromagnetic conversion device is positioned by the positioning parts, thus improving workability and resistance to relative position shift to the magnet when an external force is applied to the magnetoelectric conversion device in the subsequent steps.

Since the magnetoelectric conversion device has high resistance to relative position shift to the magnet, the relative positional relationships among the magnet, the magnetic rotation body, and the magnetoelectric conversion device are stabilized. Likewise, a magnetic circuit made up of them is stabilized and performance and reliability are improved.

According to the invention, since the base is formed with the press fit part for pressing the lead of the magnetoelectric conversion device, the lead of the magnetoelectric conversion device is fixed to the base even before completion of a soldering step, and when solder is applied, trouble of deforming the lead becomes hard to occur, improving workability and also reliability of soldering.

After soldering, the lead of the magnetoelectric conversion device is also fixed at two points of the press fit part and the soldering part, thus reliability of vibration resistance, etc., is improved.

According to the invention, since the surface mount electrode parts of the insert conductor are heightened with respect to the peripheral bases, stress caused by thermal constriction of the base material can be decreased, improving heat shock resistance of the joints of the surface mount electronic components and the surface mount electrode parts, improving reliability of the sensor.

Since the surface mount electrode parts are of a single structure rather than double structure, the pressing process can be reduced, improving workability. Also, the number of surface mount electrode parts can be increased, improving freedom of layout.

According to the invention, since the guides for positioning the base are formed inside the case, resistance to vibration is improved and the relative positional relationship of a magnet and a magnetoelectric conversion device to a magnetic rotation body is stabilized. Likewise, a magnetic circuit made up of them is stabilized and performance and reliability are improved.

According to the invention, the base and the connector part are molded in different steps, thus when the base is molded, the insert conductor can be held with a metal mold; resin pressure at molding does not cause the insert conductor to be deformed or different insert conductors to be short-circuited. Since the insert conductor is positioned and fixed by resin when the base is molded, when the connector part is molded, the insert conductor is not exposed to the surface, thus eliminating the need for applying a seal material and improving workability and reliability.

According to the invention, since the frame formed by the insert conductor having the positioning parts between the bases is provided, the positioning parts of the frame formed by the insert conductor can be used to mount and reflow-solder the electronic components, improving workability.

The steps can be executed in the order of application of solder, mounting and reflow-soldering of the electronic components, and cutting of the frame of the insert conductor, productivity being improved and manufacturing costs being reduced.

According to the invention, since the resin injection port when the case is molded is disposed near the position of the magnetoelectric conversion device, resin of the case between the magnetoelectric conversion device and the magnetic rotation body can be thinned, improving sensor performance.

What is claimed is:

1. A method of manufacturing a rotation sensor comprising the steps of:
   (a) providing an insert conductor having a predetermined shape and having at least a connector terminal and a conversion device terminal;
   (b) insert-molding said insert conductor in a resin base such that at least said connector terminal and said conversion device terminal of said insert conductor remain exposed from said resin base; and
   (c) molding a resin connector part such that said resin connector part encircles said connector terminal, wherein said steps (b) and (c) are performed at different times.

2. The method as recited in claim 1, further comprising the step of:
   (d) connecting a magnetoelectric conversion device to said conversion device terminal of said insert conductor.

3. The method as recited in claim 2, further comprising the steps of:
   (e) insert-molding at least a portion of a permanent magnet in said resin case; and
   (f) providing an elastic member between said permanent magnet and said magnetoelectric conversion device.

4. The method as recited in claim 2, further comprising the steps of:
   (e) providing positioning parts at a tip of said resin base; and
   (f) sandwiching said magnetoelectric conversion device between said positioning parts to securely hold said magnetoelectric conversion device.

5. The method as recited in claim 2, further comprising the steps of:
   (e) forming a press fit part at a tip of said resin base; and
   (f) pressing an output terminal of said magnetoelectric conversion device against said conversion device terminal of said insert conductor with said press fit part.

6. The method as recited in claim 3, further comprising the steps of:
   (g) providing positioning parts at a tip of said resin base;
   (h) sandwiching said magnetoelectric conversion device between said positioning parts to securely hold said magnetoelectric conversion device;
   (i) forming a press fit part at said tip of said resin base; and
   (j) pressing an output terminal of said magnetoelectric conversion device against said conversion device terminal of said insert conductor with said press fit part.

7. The method as recited in claim 1, wherein said step (b) comprises the steps of:
   (b1) insert-molding said insert conductor in said resin base such that a surface mount connector terminal remains exposed from said resin base at a predetermined position, and wherein said method further comprises the step of:
   (d) mounting a surface mount electronic component on said surface mount connector at said predetermined position.

8. The method as recited in claim 7, wherein said surface mount connector is shaped substantially like a Z and an upper portion of said Z is exposed from said resin base.

9. The method as recited in claim 1, further comprising the step of:
   (d) inserting said resin base into a case such that said case covers and protects said conversion device terminal.

10. The method as recited in claim 9, wherein an interior of said case comprises at least one guide that guides said resin base to correctly position said resin base when said resin base is inserted in said case.

11. The method as recited in claim 10, wherein said guide comprises tapered edges to facilitate insertion of said resin base in said case.

12. The method as recited in claim 10, wherein said guide is integrally formed with said case.

13. The method as recited in claim 9, wherein said case has a first surface and wherein said method further comprises the steps of:
   (e) connecting a magnetoelectric conversion device to said conversion device terminal of said insert conductor;
   (f) forming said case via an injection molding process using a mold, wherein a resin injection port used in said injection molding process is located in said mold near an area used to form said first surface of said case and wherein said first surface is located adjacent to said magnetoelectric conversion device after said resin base is inserted in said case.

14. The method as recited in claim 9, further comprising the step of:
   (e) heat-caulking an end of said case when said resin base is inserted in said case.

15. The method as recited in claim 7, wherein said insert conductor is coupled to at least a second insert conductor via a frame containing positioning device, and
   wherein said method further comprises the steps of:
      (e) aligning said insert conductors with respect to a mounting device based on said positioning devices, wherein said mounting device mounts said surface mount electronic component to said surface mount connector at said predetermined position in said step (d) after said insert conductors are aligned with respect to said mounting device; and
      (f) cutting said frame to separate said insert conductors after said surface mount electronic component is mounted.

16. The method as recited in claim 1, wherein a portion of said resin connector part is molded around a portion of said resin base.

17. The method as recited in claim 1, wherein said resin connector part is a distinct and separate molded component than said resin base.

* * * * *